US011956565B2

(12) United States Patent
Yang (10) Patent No.: US 11,956,565 B2
(45) Date of Patent: Apr. 9, 2024

(54) MIDDLE FRAME AND DISPLAY DEVICE

(71) Applicant: Huizhou China Star Optoelectronics Display Co., Ltd., Guangdong (CN)

(72) Inventor: Baolei Yang, Guangdong (CN)

(73) Assignee: Huizhou China Star Optoelectronics Display Co., Ltd., Huizhou (CN)

( * ) Notice: Subject to any disclaimer, the term of this patent is extended or adjusted under 35 U.S.C. 154(b) by 0 days.

(21) Appl. No.: 17/435,057

(22) PCT Filed: Jul. 19, 2021

(86) PCT No.: PCT/CN2021/107147
§ 371 (c)(1),
(2) Date: Aug. 31, 2021

(87) PCT Pub. No.: WO2023/279431
PCT Pub. Date: Jan. 12, 2023

(65) Prior Publication Data
US 2024/0022683 A1    Jan. 18, 2024

(30) Foreign Application Priority Data
Jul. 8, 2021    (CN) .......................... 202110772006.0

(51) Int. Cl.
*G02F 1/1333*    (2006.01)
*H04N 5/64*    (2006.01)

(52) U.S. Cl.
CPC ......... *H04N 5/64* (2013.01); *G02F 1/133308* (2013.01); *G02F 1/133317* (2021.01)

(58) Field of Classification Search
CPC .............. H04N 5/64; G02F 1/133317; G02F 1/133308
See application file for complete search history.

(56) References Cited

U.S. PATENT DOCUMENTS

| 2016/0021774 | A1  | 1/2016  | Ha et al. |
| 2019/0363286 | A1* | 11/2019 | Hu ........................ G09F 9/301 |
| 2022/0252917 | A1* | 8/2022  | Zou .................. G02F 1/133325 |

FOREIGN PATENT DOCUMENTS

| CN | 102609139 | 7/2012 |
| CN | 110673402 | 1/2020 |
| CN | 110784566 | 2/2020 |
| CN | 111562695 | 8/2020 |
| CN | 112782890 | 5/2021 |

OTHER PUBLICATIONS

International Search Report and the Written Opinion dated Apr. 2, 2022 From the International Searching Authority Re. Application No. PCT/CN2021/107147 and Its Translation Into English. (13 Pages).

\* cited by examiner

*Primary Examiner* — Anne M Hines (57) ABSTRACT

A middle frame and a display device are provided. The middle frame includes a lamination surface, an outside face, and an inside face. A drainage trough is disposed on the lamination surface. A diversion groove and a sealant storage tank are disposed on the outside face. A width of the drainage trough is less than a width of the diversion groove. The width of the diversion groove is less than a width of the sealant storage tank. The above-described configuration can ensure a greatest degree of lamination area, ensuring reliability of lamination, preventing sealant from flowing into a display area, and increasing yield of a display panel.

20 Claims, 8 Drawing Sheets

MIDDLE FRAME AND DISPLAY DEVICE

RELATED APPLICATIONS

This application is a National Phase of PCT Patent Application No. PCT/CN2021/107147 having International filing date of Jul. 19, 2021, which claims the benefit of priority of Chinese Patent Application No. 202110772006.0 filed on Jul. 8, 2021. The contents of the above applications are all incorporated by reference as if fully set forth herein in their entirety.

FIELD AND BACKGROUND OF THE INVENTION

The present application relates to display field, and specifically to a middle frame and a display device.

Currently, with development of display technology, people's requirements for consumer electronics are no longer merely limited to their functions, and artistic designs and visual experience are also considered now. Ultra-narrow border display products that are popular now are an example.

With extreme development of backlight modules of ultra-narrow border products, widths of middle frames of display devices have become increasingly smaller. With a narrower middle frame, when laminating using sealant, delamination due to insufficient sealant occurs, and sealant flows into a display area and affects display effects. Reliability of lamination quality has become a difficulty of a sealant lamination approach.

Therefore, how to prevent a narrower middle frame of a display device from affecting sealant lamination quality is a problem that needs to be solved by panel manufacturing factories.

SUMMARY OF THE INVENTION

Embodiments of the present application provide a middle frame and a display device to solve a technical problem in conventional technology that a narrower middle frame of a display panel affects sealant lamination quality.

Embodiments of the present application provide a middle frame that includes a lamination surface, an outside face, and an inside face, wherein the lamination surface is located between the outside face and the inside face, the outside face is disposed opposite to the inside face, a drainage trough is disposed on the lamination surface, a diversion groove and a sealant storage tank are disposed on the outside face, one end of the diversion groove is communicatively connected to the drainage trough, other end of the diversion groove is communicatively connected to the sealant storage tank, a width of the drainage trough is less than a width of the diversion groove, and the width of the diversion groove is less than a width of the sealant storage tank.

Optionally, in some embodiments of the application, the diversion groove includes a first end and a second end disposed opposite to each other, the first end is an end of the diversion groove close to the lamination surface, the second end is an end of the diversion groove away from the lamination surface, and the width of the diversion groove is gradually increased in a direction from the first end to the second end.

Optionally, in some embodiments of the application, an auxiliary drainage trough is disposed on one side of the lamination surface close to the outside face, and the auxiliary drainage trough is communicatively connected to the drainage trough.

Optionally, in some embodiments of the application, a width of the auxiliary drainage trough is equal to the width of the drainage trough.

Optionally, in some embodiments of the application, an auxiliary sealant storage tank is disposed on the outside face, the auxiliary sealant storage tank is located on one side of the sealant storage tank close to the lamination surface, the auxiliary sealant storage tank is communicatively connected to the diversion groove, and a width of the auxiliary sealant storage tank is greater than the width of the diversion groove.

Optionally, in some embodiments of the application, the width of the auxiliary sealant storage tank ranges from 0.04 millimeters to 0.2 millimeters.

Optionally, in some embodiments of the application, an auxiliary diversion groove is disposed on the lamination surface, the auxiliary diversion groove is communicatively connected to the drainage trough, and a width of the auxiliary diversion groove is less than the width of the diversion groove.

Optionally, in some embodiments of the application, the width of the auxiliary diversion groove ranges from 0.04 millimeters to 0.2 millimeters.

Optionally, in some embodiments of the application, one end of the drainage trough is extended to the outside face, and other end of the drainage trough is extended to the inside face.

Optionally, in some embodiments of the application, widths of the drainage trough, the diversion groove, and the sealant storage tank all range from 0.04 millimeters to 0.2 millimeters.

Optionally, in some embodiments of the application, the drainage trough is multiple, drainage troughs are parallel to each other, and a distance between two drainage troughs ranges from 3 millimeters to 5 millimeters.

Correspondingly, embodiments of the present application further provide a display device that includes a middle frame, wherein the middle frame includes a lamination surface, an outside face, and an inside face, the lamination surface is located between the outside face and the inside face, the outside face is disposed opposite to the inside face, a drainage trough is disposed on the lamination surface, a diversion groove and a sealant storage tank are disposed on the outside face, one end of the diversion groove is communicatively connected to the drainage trough, other end of the diversion groove is communicatively connected to the sealant storage tank, a width of the drainage trough is less than a width of the diversion groove, and the width of the diversion groove is less than a width of the sealant storage tank.

Optionally, in some embodiments of the application, the diversion groove includes a first end and a second end disposed opposite to each other, the first end is an end of the diversion groove close to the lamination surface, the second end is an end of the diversion groove away from the lamination surface, and the width of the diversion groove is gradually increased in a direction from the first end to the second end.

Optionally, in some embodiments of the application, an auxiliary drainage trough is disposed on one side of the lamination surface close to the outside face, and the auxiliary drainage trough is communicatively connected to the drainage trough.

Optionally, in some embodiments of the application, a width of the auxiliary drainage trough is equal to the width of the drainage trough.

Optionally, in some embodiments of the application, an auxiliary sealant storage tank is disposed on the outside face, the auxiliary sealant storage tank is located on one side of the sealant storage tank close to the lamination surface, the auxiliary sealant storage tank is communicatively connected to the diversion groove, and a width of the auxiliary sealant storage tank is greater than the width of the diversion groove.

Optionally, in some embodiments of the application, an auxiliary diversion groove is disposed on the lamination surface, the auxiliary diversion groove is communicatively connected to the drainage trough, and a width of the auxiliary diversion groove is less than the width of the diversion groove.

Optionally, in some embodiments of the application, one end of the drainage trough is extended to the outside face, and other end of the drainage trough is extended to the inside face.

Optionally, in some embodiments of the application, widths of the drainage trough, the diversion groove, and the sealant storage tank all range from 0.04 millimeters to 0.2 millimeters.

Optionally, in some embodiments of the application, the drainage trough is multiple, drainage troughs are parallel to each other, and a distance between two drainage troughs ranges from 3 millimeters to 5 millimeters.

Embodiments of the present application adopt a middle frame and a display device. The middle frame a lamination surface, an outside face, and an inside face. A drainage trough is disposed on the lamination surface. A diversion groove and a sealant storage tank are disposed on the outside face. One end of the diversion groove is communicatively connected to the drainage trough. Other end of the diversion groove is communicatively connected to the sealant storage tank. A width of the drainage trough is less than a width of the diversion groove. The width of the diversion groove is less than a width of the sealant storage tank. When sealant is dropped on the lamination surface, the sealant will flow from the lamination surface into the drainage trough, the diversion groove, and the sealant storage tank. When a display panel is laminated, the sealant stored in the drainage trough, the diversion groove, and the sealant storage tank will flow back into and fill a gap between the display panel and the middle frame. The above-described configuration can ensure a greatest degree of lamination area, ensuring reliability of lamination, preventing the sealant from flowing into a display area, and increasing yield of the display panel.

BRIEF DESCRIPTION OF THE SEVERAL VIEWS OF THE DRAWINGS

The accompanying figures to be used in the description of embodiments of the present application will be described in brief to more clearly illustrate the technical solutions of the embodiments. The accompanying figures described below are only part of the embodiments of the present application, from which figures those skilled in the art can derive further figures without making any inventive efforts.

DETAILED DESCRIPTION OF PREFERRED SPECIFIC EMBODIMENTS OF THE INVENTION

For better clearness and definiteness of purpose, technical approach, and effect of the present application, the following further describes embodiments of the present application in detail with reference to accompanying drawings. It should be understood that the embodiments described here is merely for explaining the present application and not intended to limit the present application.

In description of the present application, it should be understood that terms that indicates orientation or relation of position such as "length", "width", "thickness", "upper", "lower" are based on orientation or relation of position accompanying drawings show. They are simply for purpose of description of the present application and simplifying of description, and do not mean or suggest the devices or components have a specified orientation and constructed and operated in a specified orientation; therefore, it should not be understood as limitation of the present application. In description of the present application, "multiple" means two or more unless otherwise clearly and concretely specified.

In description of the present application, it should be understood that terms "first" and "second" are used simply for purpose of description and cannot be understood to mean or suggest relative importance or implicitly mean amount of the technical features. Therefore, features with terms "first" and "second" can mean or implicitly include one or more of the features and should not be understood as limitation of the present application.

Embodiments of the present application provide a middle frame of a display panel and a display device, and the following separately describes them in detail. It should be explained that description order of the following embodiments does not limit order of favorableness of the embodiments.

Figure 1:
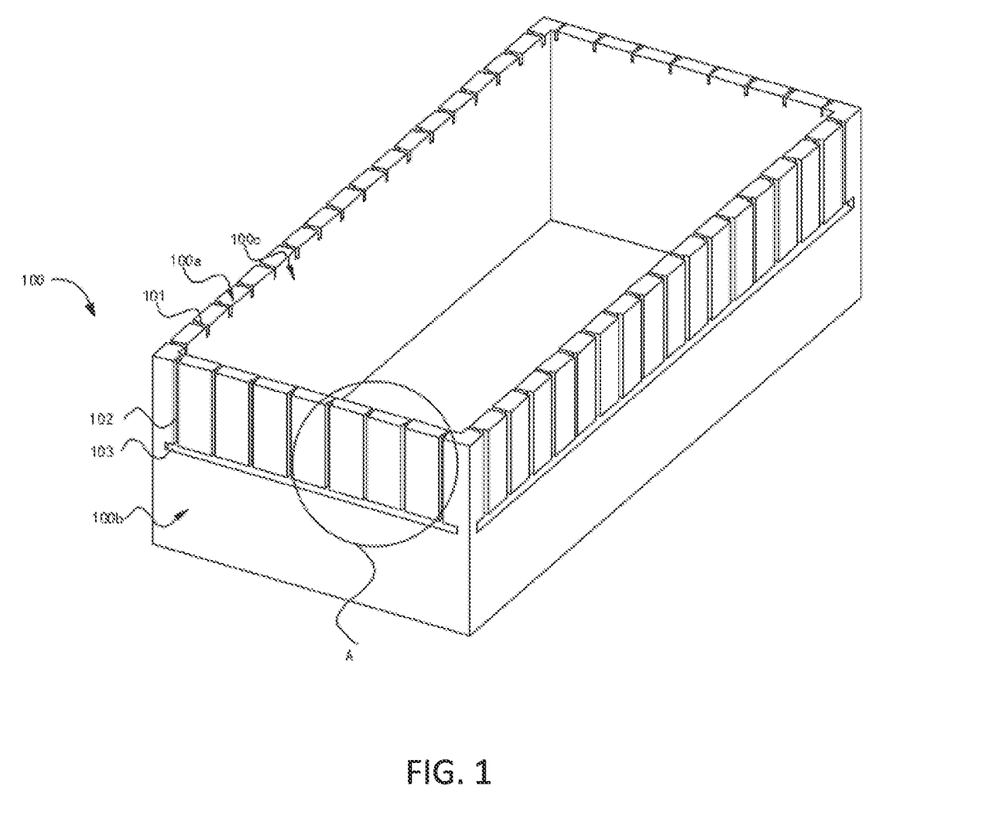
FIG. 1 is a structural schematic diagram of a middle frame according to a first embodiment of the present application.
Figure 2:
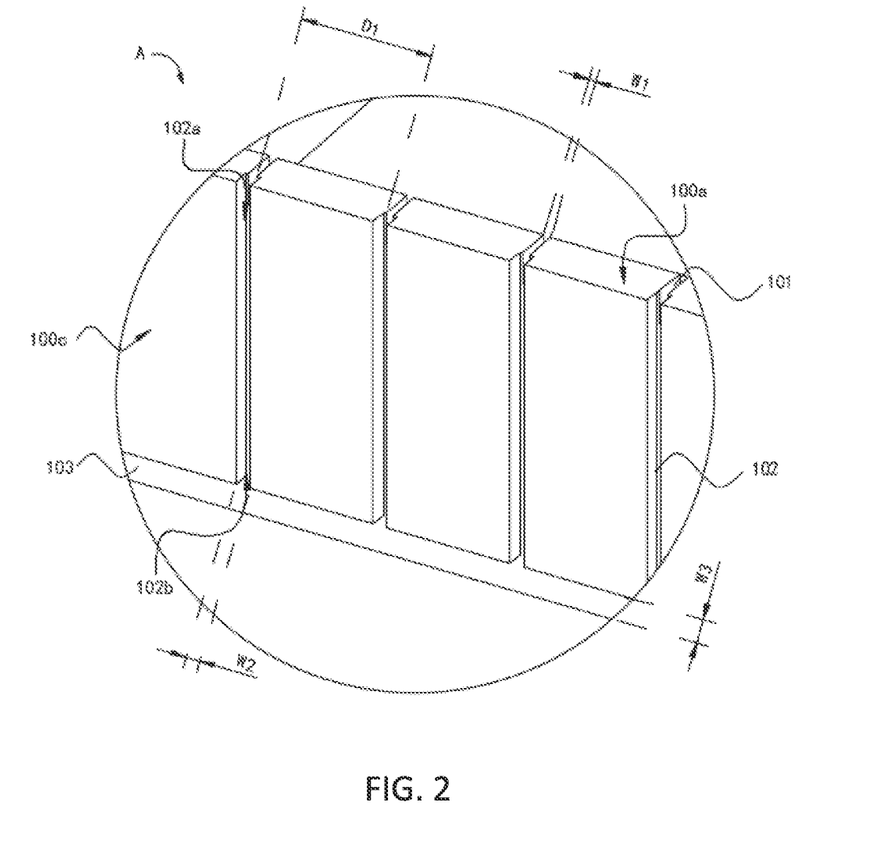
FIG. 2 is a partial structural schematic diagram of area A of the middle frame shown in FIG. 1.

Referring to FIG. 1 and FIG. 2, FIG. 1 is a structural schematic diagram of a middle frame according to a first embodiment of the present application, and FIG. 2 is a partial structural schematic diagram of area A of the middle frame shown in FIG. 1. The middle frame 100 according to embodiments of the present application includes a lamination surface 100a, an outside face 100b, and an inside face 100c. The lamination surface 100a is located between the outside face 100b and the inside face 100c. The outside face 100b is disposed opposite to the inside face 100c.

A drainage trough 101 is disposed on the lamination surface 100a. A diversion groove 102 and a sealant storage tank 103 are disposed on the outside face 100b. One end of the diversion groove 102 is communicatively connected to the drainage trough 101. Other end of the diversion groove 102 is communicatively connected to the sealant storage tank 103. A width of the drainage trough 101 is less than a width of the diversion groove 102. The width of the diversion groove 102 is less than a width of the sealant storage tank 103.

It should be explained that the lamination surface 100a is a surface of the middle frame 100 for coating sealant. The outside face 100b is a surface of the middle frame 100 away from a display area. The inside face 100c is a surface of the middle frame 100 close to the display area.

A height that a liquid rises in the capillary phenomenon can be obtained using following capillary phenomenon formula.

$$H=(2\sigma \cos \theta)/\rho g R$$

Wherein, H is the height that the liquid rises in the capillary phenomenon, σ is surface tension, θ is an angle between a surface of the liquid and a wall of a capillary, ρ is a density of the liquid, g is acceleration of gravity, and R is a radius of the capillary. It should be explained that θ is decided depending on factors such as a type of the liquid, a material of the wall of the capillary, and a type of a gas contacting the liquid.

It should be explained that, when sealant is dropped on the lamination surface 100a of the middle frame 100, the lamination surface 100a of the middle frame 100 can be approximated as a trough having an infinitely long radius. Therefore, according to principles of the capillary phenomenon, the sealant will flow from the lamination surface 100a of the middle frame 100 to the drainage trough 101, and when the drainage trough 101 is filled, the sealant will flow to the diversion groove 102 connected thereto and then to the sealant storage tank 103.

It should be explained that the sealant storage tank 103 functions to temporarily store the sealant, thereby preventing the sealant from flowing into the display area due to excessive sealant, and preventing display abnormalities due to the sealant blocking display pixels.

A width W1 of the drainage trough 101 is less than a width W2 of the diversion groove 102. The width W2 of the diversion groove 102 is less than a width W3 of the sealant storage tank 103.

It should be explained that when a display module is assembled with the middle frame 100, there is an extremely small gap between the lamination surface 100a of the middle frame 100 and the display module, and the gap can be approximated as a trough having an infinitely short radius. Therefore, according to principles of the capillary phenomenon, the sealant will flow from the sealant storage tank 103 to the diversion groove 102, then from the sealant storage tank 103 to the drainage trough 101, and finally from the drainage trough 101 to the lamination surface 100a of the middle frame 100, until the display module is completely laminated to the middle frame 100. Because the gap between the lamination surface 100a of the middle frame 100 and the display module can be completely filled by the sealant, a greatest degree of lamination area can be ensured, increasing reliability of sealant lamination.

The diversion groove 102 includes a first end 102a and a second end 102b disposed opposite to each other. The first end 102a is an end of the diversion groove 102 close to the lamination surface 100a. The second end 102b is an end of the diversion groove 102 away from the lamination surface 100a. The width W2 of the diversion groove 102 is gradually increased in a direction from the first end 102a to the second end 102b.

It should be explained that when the display module is assembled with the middle frame 100, it is required that the sealant flows from the sealant storage tank 103 to the diversion groove 102, and from the diversion groove 102 to the drainage trough 101. In this course, the sealant flows from the end of the diversion groove 102 away from the lamination surface 100a to the end of the diversion groove 102 close to the lamination surface 100a. According to the capillary phenomenon, the sealant would flow from a trough having a longer radius to a trough having a shorter radius. Therefore, making the width W2 of the diversion groove 102 gradually increase in the direction from the first end 102a to the second end 102b facilitates the sealant flowing from the second end 102b of the diversion groove 102 to the first end 102a of the diversion groove 102, facilitating complete filling of sealant in the gap between the lamination surface 100a of the middle frame 100 and the display module, ensuring a greatest degree of lamination area, and increasing reliability of sealant lamination.

One end of the drainage trough 101 is extended to the outside face 100b. Other end of the drainage trough 101 is extended to the inside face 100c.

It should be explained that by extending the one end of the drainage trough 101 to the outside face 100b and the other end of the drainage trough 101 to the inside face 100c, accumulation of sealant on the lamination surface 100a can be prevented.

The drainage trough 101 is perpendicular to the outside face 100b of the middle frame 100. The diversion groove 102 is perpendicular to the lamination surface 100a of the middle frame 100. The sealant storage tank 103 is perpendicular to the diversion groove 102.

It should explained that when the sealant flows from the sealant storage tank 103 to the diversion groove 102, and from the diversion groove 102 to the drainage trough 101, according to the capillary phenomenon, gravity of the sealant is a force that needs to be overcome. Therefore, making the drainage trough 101 be perpendicular to the outside face 100b of the middle frame 100, the diversion groove 102 perpendicular to the lamination surface 100a of the middle frame 100, and the sealant storage tank 103 perpendicular to the diversion groove 102 ensures more sealant to flow from the sealant storage tank 103 to the diversion groove 102 and from the diversion groove 102 to the drainage trough 101 without varying widths of the drainage trough 101, the diversion groove 102, and the sealant storage tank 103. Adopting the above-described configuration can increase a quantity of sealant stored by the drainage trough 101, the diversion groove 102, and the sealant storage tank 103, preventing excessive sealant from flowing into other areas and affecting display effects of a display device.

The width W1 of the drainage trough 101 ranges from 0.04 millimeters to 0.2 millimeters. Specifically, the width W1 of the drainage trough 101 is 0.04 millimeters, 0.06 millimeters, 0.08 millimeters, 0.11 millimeters, 0.14 millimeters, 0.17 millimeters, or 0.2 millimeters. Specific width W1 of the drainage trough 101 is decided according to manufacturing requirements of the middle frame 100 of the display module.

The width W2 of the diversion groove 102 ranges from 0.04 millimeters to 0.2 millimeters. Specifically, the width W2 of the diversion groove 102 is 0.04 millimeters, 0.06 millimeters, 0.08 millimeters, 0.11 millimeters, 0.14 millimeters, 0.17 millimeters, or 0.2 millimeters. Specific width W2 of the diversion groove 102 is decided according to manufacturing requirements of the middle frame 100 of the display module.

The width W3 of the sealant storage tank 103 ranges from 0.04 millimeters to 0.2 millimeters. Specifically, the width W3 of the sealant storage tank 103 is 0.04 millimeters, 0.06 millimeters, 0.08 millimeters, 0.11 millimeters, 0.14 millimeters, 0.17 millimeters, or 0.2 millimeters. Specific width W3 of the sealant storage tank 103 is decided according to manufacturing requirements of the middle frame 100 of the display module.

It should be explained that there are a plurality of the drainage troughs 101, and the plurality of drainage troughs 101 are parallel to each other. A distance D1 between two drainage troughs 101 ranges from 3 millimeters to 5 millimeters. Specifically, the distance D1 between two drainage troughs 101 is 3 millimeters, 3.2 millimeters, 3.4 millimeters, 3.7 millimeters, 4 millimeters, 4.5 millimeters, or 5 millimeters. Specific distance D1 between two drainage troughs 101 is decided according to manufacturing requirements of the middle frame 100 of the display module.

A cross-sectional shape of the drainage trough 101, the diversion groove 102, and the sealant storage tank 103 is rectangular, trapezoidal, or semicircular. In terms of surface energy per unit area and manufacturing, when the cross-sectional shape of the drainage trough 101, the diversion groove 102, and the sealant storage tank 103 is semicircular, a highest reliability of sealant lamination is available.

Figure 3:
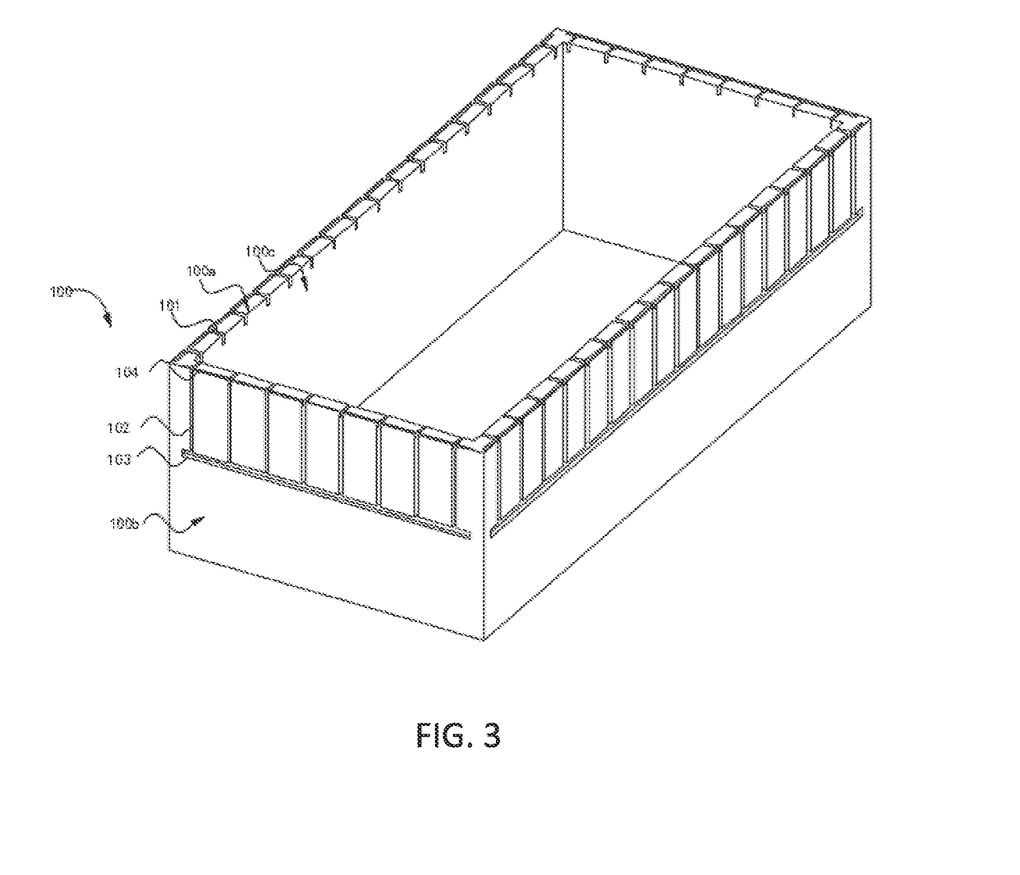
FIG. 3 is a structural schematic diagram of the middle frame according to a second embodiment of the present application.
Figure 4:
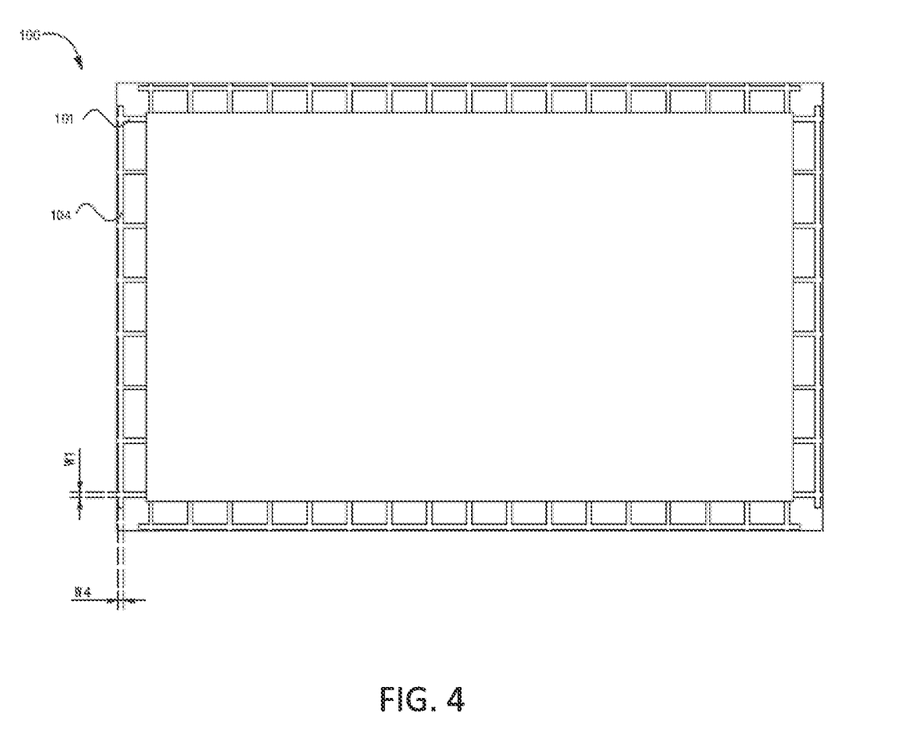
FIG. 4 is a top view of the middle frame according to the second embodiment of the present application.

Referring to FIG. 3 and FIG. 4, FIG. 3 is a structural schematic diagram of the middle frame according to a second embodiment of the present application, and FIG. 4 is a top view of the middle frame according to the second embodiment of the present application. As shown in FIG. 3 and FIG. 4, the difference between the middle frame shown in FIG. 3 and that shown in FIG. 1 is that an auxiliary drainage trough 104 is disposed on one side of the lamination surface 100a close to the outside face 100b. The auxiliary drainage trough 104 is communicatively connected to the drainage trough 101.

A width W4 of the auxiliary drainage trough 104 is equal to the width W1 of the drainage trough 101. Because the width W2 of the diversion groove 102 is greater than the width W1 of the drainage trough 101, the width W2 of the diversion groove 102 is greater than the width W4 of the auxiliary drainage trough 104.

It should be explained that when sealant is used to assemble the display module and the middle frame 100, it flows from the drainage trough 101 to the lamination surface 100a of the middle frame 100. When the sealant flows from the diversion groove 102 to the drainage trough 101, because the width W2 of the diversion groove 102 is greater than the width W4 of the auxiliary drainage trough 104, according to principles of the capillary phenomenon, a part of the sealant also flows from the diversion groove 102 to the auxiliary drainage trough 104.

Furthermore, the width W4 of the auxiliary drainage trough 104 is equal to the width W1 of the drainage trough 101. The drainage trough 101 would not draw the sealant that flows from the diversion groove 102 to the auxiliary drainage trough 104. The auxiliary drainage trough 104 also would not draw the sealant that flows from the diversion groove 102 to the drainage trough 101. Therefore, a configuration of the auxiliary drainage trough 104 can increase an application speed of the sealant at the gap between the lamination surface 100a of the middle frame 100 and the display module.

It should be explained that there are a plurality of the drainage troughs 101. The auxiliary drainage trough 104 is communicatively connected to at least one of the drainage troughs 101. When the auxiliary drainage trough 104 is communicatively connected to all of the drainage troughs 101, the auxiliary drainage trough 104 increasing the application speed of the sealant at the gap between the lamination surface 100a of the middle frame 100 and the display module has a best effect.

The auxiliary drainage trough 104 is perpendicular to the drainage troughs 101. A width W1 of the auxiliary drainage trough 104 ranges from 0.04 millimeters to 0.2 millimeters. Specifically, the width W1 of the auxiliary drainage trough 104 is 0.04 millimeters, 0.06 millimeters, 0.08 millimeters, 0.11 millimeters, 0.14 millimeters, 0.17 millimeters, or 0.2 millimeters. Specific width W1 of the auxiliary drainage trough 104 is decided according to manufacturing requirements of the middle frame 100 of the display module.

Figure 5:
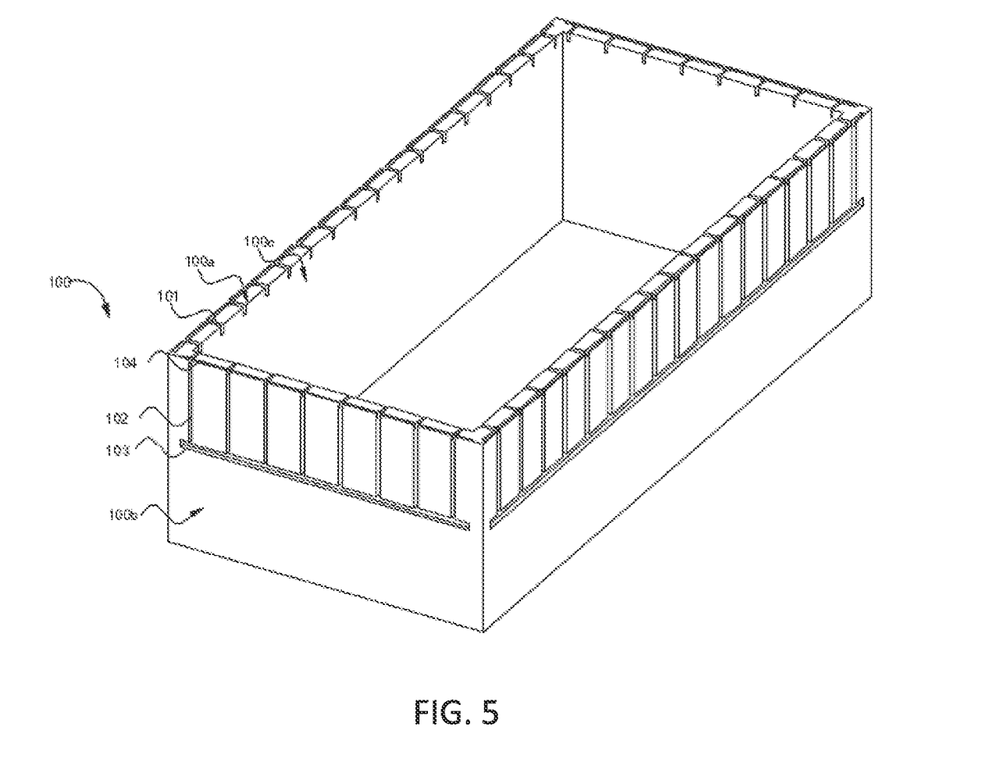
FIG. 5 is a structural schematic diagram of the middle frame according to a third embodiment of the present application.
Figure 6:
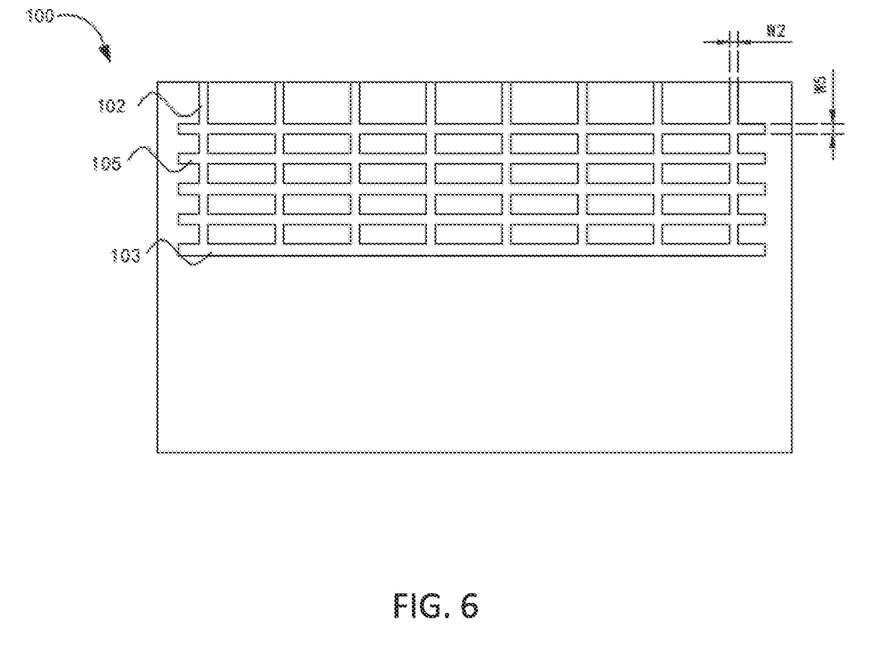
FIG. 6 is a left view of the middle frame according to the third embodiment of the present application.

Referring to FIG. 5 and FIG. 6, FIG. 5 is a structural schematic diagram of the middle frame according to a third embodiment of the present application, and FIG. 6 is a left view of the middle frame according to the third embodiment of the present application. The difference between the middle frame shown in FIG. 5 and that shown in FIG. 1 is that an auxiliary sealant storage tank 105 is disposed on the outside face 100b. The auxiliary sealant storage tank 105 is located on one side of the sealant storage tank 103 close to the lamination surface 100a, and the auxiliary sealant storage tank 105 is communicatively connected to the diversion groove 102. A width W5 of the auxiliary sealant storage tank 105 is greater than the width W2 of the sealant storage tank 103.

It should be explained that because a quantity of sealant used to laminate the middle frame 100 and the display module is greater, the drainage trough 101, the diversion groove 102, and the sealant storage tank 103 do not necessarily store all of the sealant. A plurality of the auxiliary sealant storage tanks 105 connecting to the diversion groove 102 increases a quantity of sealant stored by the middle frame. Therefore, the auxiliary sealant storage tank 105 can prevent sealant from flowing into other areas and affecting display effects of the display module, ensuring a greatest degree of lamination area, and increasing reliability of sealant lamination.

Furthermore, according to the capillary phenomenon formula, a height that a liquid rises is limited. A configuration of the plurality of auxiliary sealant storage tanks 105 located on one side of the sealant storage tank 103 close to the lamination surface 100a can decrease a height that sealant is required to rise in the diversion groove 102. Therefore, the auxiliary sealant storage tank 105 can prevent the sealant in the diversion groove 102 from being unable to flow into the drainage trough 101 due to an insufficient exerted force, thereby increasing reliability of sealant lamination.

It should be explained that the auxiliary sealant storage tank 105 is perpendicular to the diversion groove 102. The width W5 of the auxiliary sealant storage tank 105 ranges from 0.04 millimeters to 0.2 millimeters. Specifically, the width W5 of the auxiliary sealant storage tank 105 is 0.04 millimeters, 0.06 millimeters, 0.08 millimeters, 0.11 millimeters, 0.14 millimeters, 0.17 millimeters, or 0.2 millimeters. Specific width W5 of the auxiliary sealant storage tank 105 is decided according to manufacturing requirements of the middle frame 100 of the display module.

Figure 7:
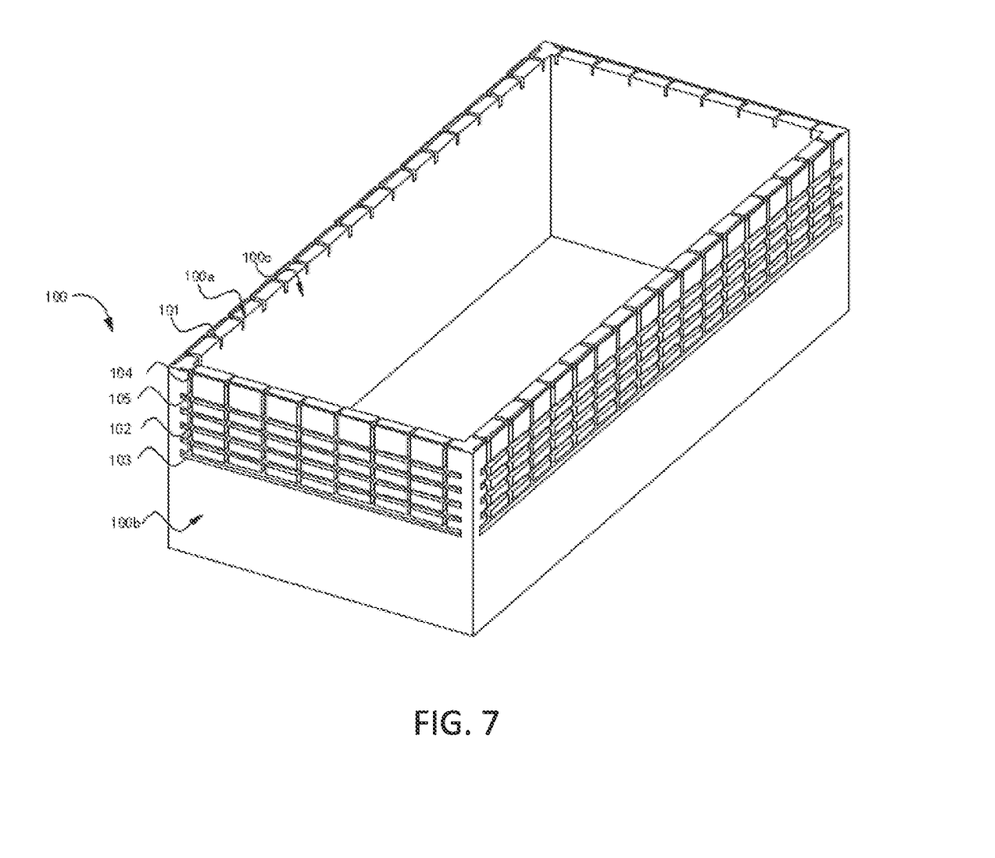
FIG. 7 is a structural schematic diagram of the middle frame according to a fourth embodiment of the present application.
Figure 8:
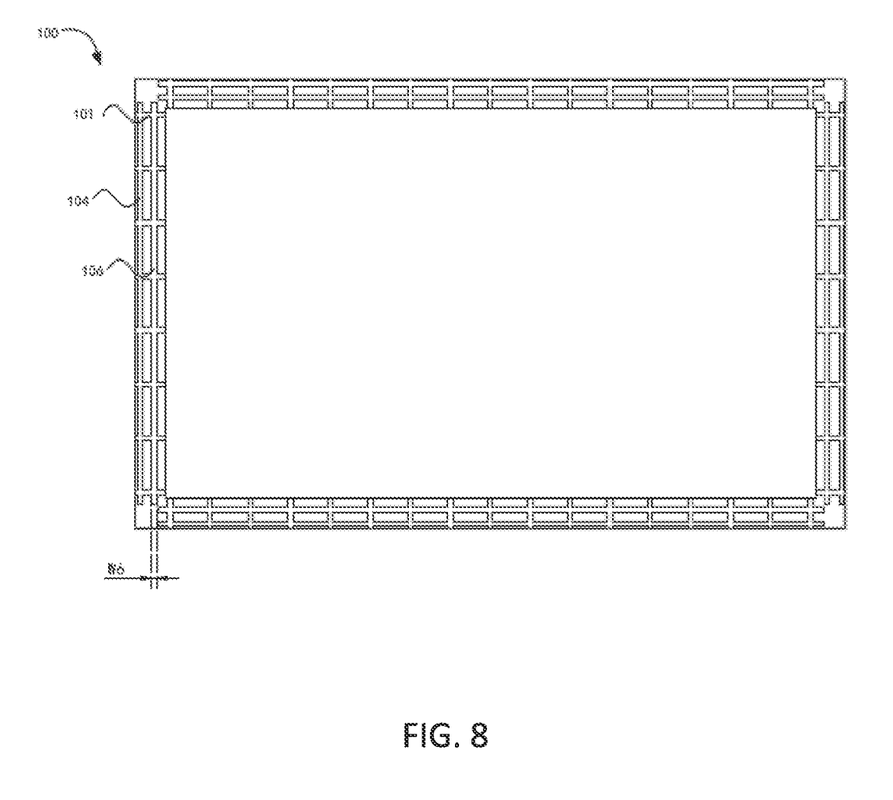
FIG. 8 is a top view of the middle frame according to the fourth embodiment of the present application.

Referring to FIG. 7 and FIG. 8, FIG. 7 is a structural schematic diagram of the middle frame according to a fourth embodiment of the present application, and FIG. 8 is a top view of the middle frame according to the fourth embodiment of the present application. The difference between the middle frame shown in FIG. 7 and that shown in FIG. 5 is that an auxiliary diversion groove 106 is further disposed on the lamination surface 100a, and the auxiliary diversion groove 106 is communicatively connected to the drainage trough 101. A width W6 of the auxiliary diversion groove 106 is less than the width W2 of the diversion groove 102.

It should be explained that when sealant is used to assemble a display module and the middle frame 100, there is an extremely small gap between the lamination surface 100a of the middle frame 100 and the display module, and the gap can be approximated as a trough having an infinitely short radius. Therefore, according to principles of the capillary phenomenon, the sealant would not only flow from the drainage trough 101 and the auxiliary drainage trough 104 to the lamination surface 100a of the middle frame 100, but also flow from the auxiliary diversion groove 106 to the lamination surface 100a of the middle frame 100, until the display module is completely laminated to the middle frame 100. Therefore, the auxiliary diversion groove 106 can increase an application speed of the sealant at the gap between the lamination surface 100a of the middle frame 100 and the display module.

When sealant is dropped on the lamination surface 100a of the middle frame 100, the lamination surface 100a of the middle frame 100 can be approximated as a trough having an infinitely long radius. Therefore, according to principles of the capillary phenomenon, the sealant will flow from the lamination surface 100a of the middle frame 100 to the drainage trough 101, the auxiliary drainage trough 104, and the auxiliary diversion groove 106. Furthermore, the width W6 of the auxiliary diversion groove 106 is less than the width W2 of the diversion groove 102. The diversion groove 102 would not draw sealant that flows to the auxiliary diversion groove 106. Therefore, the auxiliary diversion groove 106 functions to temporarily store the sealant, thereby preventing the sealant from flowing into a display area due to excessive sealant, and preventing display abnormalities due to the sealant blocking display pixels.

It should be explained that the auxiliary diversion groove 106 is perpendicular to the drainage trough 101. The width W6 of the auxiliary diversion groove 106 ranges from 0.04 millimeters to 0.2 millimeters. Specifically, the width W6 of the auxiliary diversion groove 106 is 0.04 millimeters, 0.06 millimeters, 0.08 millimeters, 0.11 millimeters, 0.14 millimeters, 0.17 millimeters, or 0.2 millimeters. Specific width W6 of the auxiliary diversion groove 106 is decided according to manufacturing requirements of the middle frame 100 of the display module.

The middle frame according to embodiments of the present application includes a lamination surface, an outside face, and an inside face. A drainage trough is disposed on the lamination surface. A diversion groove and a sealant storage tank are disposed on the outside face. One end of the diversion groove is communicatively connected to the drainage trough. Other end of the diversion groove is communicatively connected to the sealant storage tank. A width of the drainage trough is less than a width of the diversion groove. The width of the diversion groove is less than a width of the sealant storage tank. When sealant is dropped on the lamination surface, the sealant will flow from the lamination surface into the drainage trough, the diversion groove, and the sealant storage tank. When a display panel is laminated, the sealant stored in the drainage trough, the diversion groove, and the sealant storage tank will flow back into and fill a gap between the display panel and the middle frame. The above-described configuration can ensure a greatest degree of lamination area, ensuring reliability of lamination, preventing the sealant from flowing into a display area, and increasing yield of the display panel.

Correspondingly, embodiments of the present application further provide a display device. The display device includes the above-described middle frame 100. The display device according to embodiments of the present application can be at least one of a smartphone, a tablet, a mobile phone, a videophone, an e-book reader, a notebook computer, a netbook, a work station, a server, a personal digital assistant, a portable media player, a MP3 player, a mobile medical apparatus, a camera, a game console, a digital camera, a car navigator, an electronic billboard, an automated teller machine, a smart bracelet, a smartwatch, a virtual reality equipment, or a wearable device. The middle frame 100 has been explained in detail in the above-described embodiments, and therefore repeated description of the middle frame 100 in the present embodiment is omitted.

In the display device according to embodiments of the present application, the middle frame includes a lamination surface, an outside face, and an inside face. A drainage trough is disposed on the lamination surface. A diversion groove and a sealant storage tank are disposed on the outside face. One end of the diversion groove is communicatively connected to the drainage trough. Other end of the diversion groove is communicatively connected to the sealant storage tank. A width of the drainage trough is less than a width of the diversion groove. The width of the diversion groove is less than a width of the sealant storage tank. When sealant is dropped on the lamination surface, the sealant will flow from the lamination surface into the drainage trough, the diversion groove, and the sealant storage tank. When a display panel is laminated, the sealant stored in the drainage trough, the diversion groove, and the sealant storage tank will flow back into and fill a gap between the display panel and the middle frame. The above-described configuration can ensure a greatest degree of lamination area, ensuring reliability of lamination, preventing the sealant from flowing into a display area, and increasing yield of the display panel.

Although the present application has been explained in relation to its preferred embodiment, it does not intend to limit the present application. It will be apparent to those skilled in the art having regard to this present application that other modifications of the exemplary embodiments beyond these embodiments specifically described here may be made without departing from the spirit of the application. Accordingly, such modifications are considered within the scope of the application as limited solely by the appended claims.

What is claimed is:

1. A middle frame, comprising a lamination surface, an outside face, and an inside face, wherein the lamination surface is located between the outside face and the inside face, the outside face is disposed opposite to the inside face, a drainage trough is disposed on the lamination surface, a diversion groove and a sealant storage tank are disposed on the outside face, one end of the diversion groove is communicatively connected to the drainage trough, other end of the diversion groove is communicatively connected to the sealant storage tank, a width of the drainage trough is less than a width of the diversion groove, and the width of the diversion groove is less than a width of the sealant storage tank.

2. The middle frame as claimed in claim 1, wherein the diversion groove comprises a first end and a second end disposed opposite to each other, the first end is an end of the diversion groove close to the lamination surface, the second end is an end of the diversion groove away from the lamination surface, and the width of the diversion groove is gradually increased in a direction from the first end to the second end.

3. The middle frame as claimed in claim 1, wherein an auxiliary drainage trough is disposed on one side of the lamination surface close to the outside face, and the auxiliary drainage trough is communicatively connected to the drainage trough.

4. The middle frame as claimed in claim 3, wherein a width of the auxiliary drainage trough is equal to the width of the drainage trough.

5. The middle frame as claimed in claim 3, wherein an auxiliary sealant storage tank is disposed on the outside face, the auxiliary sealant storage tank is located on one side of the sealant storage tank close to the lamination surface, the auxiliary sealant storage tank is communicatively connected to the diversion groove, and a width of the auxiliary sealant storage tank is greater than the width of the diversion groove.

6. The middle frame as claimed in claim 5, wherein the width of the auxiliary sealant storage tank ranges from 0.04 millimeters to 0.2 millimeters.

7. The middle frame as claimed in claim 5, wherein an auxiliary diversion groove is disposed on the lamination surface, the auxiliary diversion groove is communicatively connected to the drainage trough, and a width of the auxiliary diversion groove is less than the width of the diversion groove.

8. The middle frame as claimed in claim 7, wherein the width of the auxiliary diversion groove ranges from 0.04 millimeters to 0.2 millimeters.

9. The middle frame as claimed in claim 1, wherein one end of the drainage trough is extended to the outside face, and other end of the drainage trough is extended to the inside face.

10. The middle frame as claimed in claim 1, wherein widths of the drainage trough, the diversion groove, and the sealant storage tank all range from 0.04 millimeters to 0.2 millimeters.

11. The middle frame as claimed in claim 1, wherein the drainage trough is multiple, drainage troughs are parallel to each other, and a distance between two drainage troughs ranges from 3 millimeters to 5 millimeters.

12. A display device, comprising a middle frame, wherein the middle frame comprises a lamination surface, an outside face, and an inside face, the lamination surface is located between the outside face and the inside face, the outside face is disposed opposite to the inside face, a drainage trough is disposed on the lamination surface, a diversion groove and a sealant storage tank are disposed on the outside face, one end of the diversion groove is communicatively connected to the drainage trough, other end of the diversion groove is communicatively connected to the sealant storage tank, a width of the drainage trough is less than a width of the diversion groove, and the width of the diversion groove is less than a width of the sealant storage tank.

13. The display device as claimed in claim 12, wherein the diversion groove comprises a first end and a second end disposed opposite to each other, the first end is an end of the diversion groove close to the lamination surface, the second end is an end of the diversion groove away from the lamination surface, and the width of the diversion groove is gradually increased in a direction from the first end to the second end.

14. The display device as claimed in claim 12, wherein an auxiliary drainage trough is disposed on one side of the lamination surface close to the outside face, and the auxiliary drainage trough is communicatively connected to the drainage trough.

15. The display device as claimed in claim 14, wherein a width of the auxiliary drainage trough is equal to the width of the drainage trough.

16. The display device as claimed in claim 14, wherein an auxiliary sealant storage tank is disposed on the outside face, the auxiliary sealant storage tank is located on one side of the sealant storage tank close to the lamination surface, the auxiliary sealant storage tank is communicatively connected to the diversion groove, and a width of the auxiliary sealant storage tank is greater than the width of the diversion groove.

17. The display device as claimed in claim 16, wherein an auxiliary diversion groove is disposed on the lamination surface, the auxiliary diversion groove is communicatively connected to the drainage trough, and a width of the auxiliary diversion groove is less than the width of the diversion groove.

18. The display device as claimed in claim 12, wherein one end of the drainage trough is extended to the outside face, and other end of the drainage trough is extended to the inside face.

19. The display device as claimed in claim 12, wherein widths of the drainage trough, the diversion groove, and the sealant storage tank all range from 0.04 millimeters to 0.2 millimeters.

20. The display device as claimed in claim 12, wherein the drainage trough is multiple, drainage troughs are parallel to each other, and a distance between two drainage troughs ranges from 3 millimeters to 5 millimeters.

* * * * *